United States Patent Office 2,847,405
Patented Aug. 12, 1958

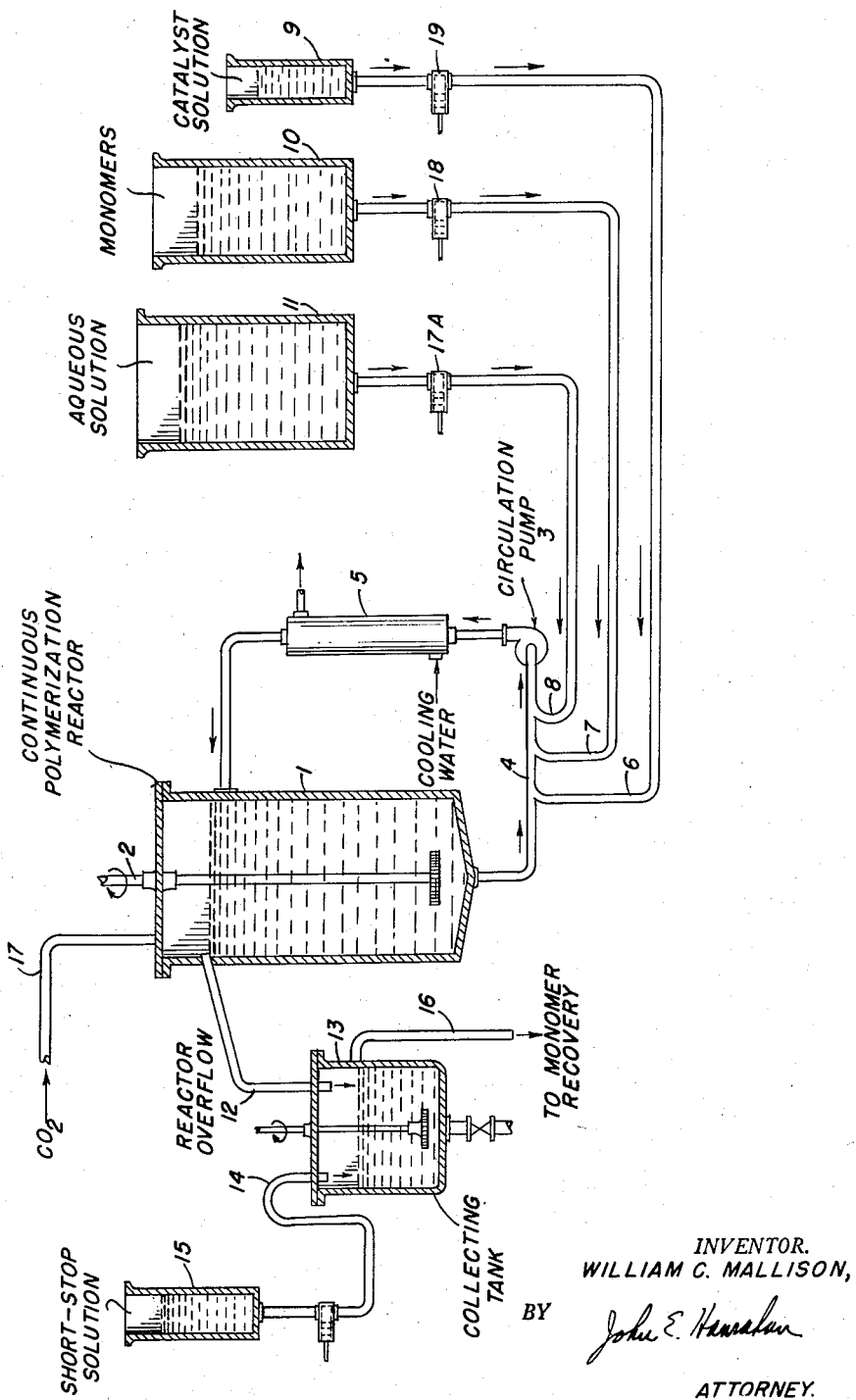

2,847,405

CONTINUOUS PROCESS FOR THE POLYMERIZATION OF ACRYLONITRILE

William Charles Mallison, Westport, Conn., assignor to American Cyanamid Company, New York, N. Y., a corporation of Maine Application January 10, 1957, Serial No. 633,473

10 Claims. (Cl. 260—80.5)

This invention relates to the polymerization of acrylonitrile and more particularly to a new process for preparing polymers and copolymers of acrylonitrile.

Polymers of acrylonitrile and its copolymers with other polymerizable organic compounds containing at least one ethylenic double bond are, of course, known. These polymers and copolymers have achieved wide use in the production of many valuable commercial products as, for example, synthetic rubber and, more recently, artificial fibers.

Difficulties have been encountered in the polymerization or copolymerization of acrylonitrile, and considerable effort has been spent in the development of practicable commercial processes for preparing these extremely useful polymers and copolymers. Recent developments in the polymerization of acrylonitrile have been concerned largely with polymerization in aqueous media, such as described in U. S. Patent No. 2,135,443, and with redox catalysis which gives high yields of polymer in a short time at moderate temperatures. The color of the polymer has been good, and molecular weights have been in the desired range.

It is an object of the present invention to provide a new and improved process for preparing polymers and copolymers of acrylonitrile.

It is another object of the present invention to provide a continuous process for the polymerization of acrylonitrile and the copolymerization of acrylonitrile with up to about 15% of a different polymerizable, water-soluble ethylenic compound.

It is a further object of the present invention to produce acrylonitrile polymers and copolymers of superior physical properties.

Still another object of the present invention is the provision of a method for polymerizing or copolymerizing acrylonitrile in which the conversion of monomer to polymer in a given reaction time is improved.

A further object of the present invention is the provision of a continuous process for the solution polymerization or copolymerization of acrylonitrile.

It is a very important object of the present invention to provide a process for producing polymers or copolymers of acrylonitrile having a narrow molecular weight range as well as consistently constant physical properties.

Another object of the present invention is the provision of an economical, practicable method for producing polymers or copolymers of acrylonitrile.

A still further object is to provide a continuous process for polymerization or copolymerization of acrylonitrile in which high monomer feed, the amount of catalyst employed, the amount of activator to catalyst, and the pH of the system are interrelated or mutually dependent to obtain the above and other desirable results.

These and other objects and advantages are attained by a continuous process for producing polymer in aqueous medium, which comprises feeding, in a continuous manner, into an agitated polymerization zone, an aqueous monomer composition, acidic aqueous liquor, and a redox catalytic system. The monomer content of the total feed in the continuous system is from between 11 and 50% by weight, the said monomer comprising acrylonitrile with up to about 15% by weight of a different monoethylenically unsaturated compound. The said aqueous liquor employed in the present invention is sufficient to maintain the said aqueous medium at a pH of from between about 1 and 4, said redox catalytic system comprising an oxygen liberating catalyst and an oxidizable component, said catalyst being present in an amount of from between .01 and 10%, based on the weight of the monomer, and the said oxidizable component is employed with respect to said catalyst in an amount of from between about 1:5 and about 4:1, respectively. When the continuous process reaches a steady state, conversions of the monomeric material to a corresponding polymeric material run on the order of at least about 70%.

The following examples are given primarily by way of illustration. No specific details therein should be construed as limitations on the present invention, except as they appear in the appended claims.

Example 1

A cylindrical glass reactor having a volume of about 1600 ml. and containing depressions on the side and bottom which serve as baffle plates is supplied with a propeller-type stirrer driven by a motor rotating at approximately 1600 R. P. M. The reactor is also equipped, at a point half-way between its top and bottom, with a glass discharge tube. The reactor is placed in a water bath, the temperature of which is controlled by a copper coil through which ice water is pumped intermittently.

1600 grams of a water slurry containing 28% polyacrylonitrile prepared in a previous similar reaction is charged to the reactor, adjusted to about pH 3 with sulfuric acid, and its temperature is brought to 35° C. A stream of acrylonitrile containing 3.1% water is introduced into the reactor through an annular space around the propeller shaft of the stirrer. A second stream comprising an aqueous solution containing 0.377 gram of sodium chlorate and 1.35 grams of sodium sulfite per 100 grams of acrylonitrile, i. e. 2.93 grams sodium chlorate and 10.5 grams sodium sulfite per liter of water, and a third stream comprising an aqueous solution of sulfuric acid containing 0.64 gram of acid per 100 grams of acrylonitrile, i. e. 5.0 g. per liter of water, are fed onto the surface of the reaction mixture in the reactor. Each of the feed streams are run continuously at a rate of 236 ml. per hour, resulting in a 27.9% monomer concentration in the feed and an average residence time of 2.2 hours.

The temperature of the reactants is maintained at about 35° C. and the polymer formed is discharged by overflow through the discharge tube in the reactor. After 7.5 hours, the pH of the reaction mixture is 2.5, and an 89% yield of a polymer having an average molecular weight of about 75,000 is obtained.

In the above example, the monomer concentration in the feed was 27.9%. In the reactor, it constituted about 3% thereof, while the polymer concentration in the reactor was equal to about 24.9%. The sodium sulfite to sodium chlorate ratio was about 3.58:1, and the percent of catalyst, based on the weight of the monomer, was about .38%.

Example 2

The procedure of Example 1 is followed. The first feed stream consists of acrylonitrile containing 3.1% water; the second feed stream consists of a solution containing 1.68 grams of ammonium persulfate per 100 grams of acrylonitrile, i. e. 13.0 g. per liter of water; the third feed stream comprises a solution containing 0.69 gram of sodium metabisulfite per 100 grams of acrylonitrile, i. e. 5.35 g. per liter of water.

After six hours, a 92.6% yield of a polymer having an average molecular weight of about 71,200 is obtained.

The percent monomer concentration in the feed was 27.6. The percent monomer concentration in the reactor was 2.0, and the polymer concentration of the reactor was about 25.6%. The percent catalyst, based on the weight of the monomer, was about 1.68%, and the activator to catalyst ratio was .41:1.

*Example 3*

The procedure of Example 2 is followed, except that the feed rates are 400 ml. per hour and 0.84 gram of ammonium persulfate and 1.7 grams of sodium metabisulfite per 100 grams of acrylonitrile, i. e. 6.51 grams of persulfate and 13.18 grams of metabisulfite per liter of water, are used.

After 4.3 hours, the pH of the reaction mixture is 3.6 and an 88% yield of a polymer having an average molecular weight of 169,000 is obtained.

The oxygen liberating catalyst is present in an amount of about .84%, based on the weight of the monomer, and the oxidizable component to catalyst ratio is 2.02:1. The monomer concentration in the feed is 27.6%, the monomer concentration of the reactor is 3.3%, and the polymer concentration of the reactor is 24.3%.

*Example 4*

The procedure of Example 1 is followed, except that the temperature is maintained at 60° C.

After 8.75 hours, the pH of the product is 2.6, and a 76.5% yield of a polymer having an average molecular weight of 57,600 is obtained.

The monomer concentration of the feed is 27.6%, the monomer concentration of the reactor is 6.5%, and the polymer concentration of the reactor is about 21.1%. The percent oxygen liberating catalyst, based on the weight of the monomer, is .38%, and the oxidizable component to catalyst ratio is 3.58:1.

*Example 5*

The procedure of Example 1 is followed. The first feed stream is of acrylonitrile containing 3.1% water. The second feed stream contains 5 grams of allylamine per 95 grams of acrylonitrile, i. e. 40.8 grams per liter of water, 1.03 equivalents of sulfuric acid per mole of allylamine, i. e. 36.3 grams per liter of water, and 1.63 grams of ammonium persulfate per 100 grams of acrylonitrile, i. e. 12.6 grams per liter of water. The third feed stream contains 0.34 gram of sodium metabisulfite per 100 grams of acrylonitrile, i. e. 2.64 grams per liter of water.

Each of the streams is introduced into the reactor at the rate of 236 ml. per hour, giving a residence time of 2.4 hours.

After 10.5 hours, the pH of the product is 3.5, and a 69.2% yield of a copolymer having an average molecular weight of about 69,700 is obtained.

The polymer concentration in the reactor when the polymerization reached a steady state was about 19%; the monomer concentration therein was about 8.5%, and the monomer concentration of the feed was 27.6%.

The percent catalyst, based on the weight of the monomer, is 1.55%, and the activator to catalyst ratio is about .21:1.

The following examples are conducted in an apparatus such as is illustrated by the single figure of the accompanying drawing. This apparatus consists of a stainless steel cylindrical reactor 1 having a working volume of about 15 gallons. This reactor is equipped with a radial turbine-type agitator 2. A stainless steel centrifugal circulation pump 3 serves to withdraw material from the bottom of the reactor through a one-inch suction line 4 and force it through a water-cooled stainless steel heat exchanger 5 back into the reactor 1 at a point beneath the surface of its contents. Feed streams 6, 7, and 8 from tanks 9, 10 and 11, respectively, to the reactor 1 are pumped into the suction line 4 of the circulation pump 3.

The reactor 1 is equipped with a gravity overflow connection 12 to a collecting tank 13 whereby a constant operating level is maintained in the reactor. Material collected in tank 13 may be held there in the absence of air or run off into another vessel or series of vessels for further polymerization, as in the case of a multistage reactor; it may be taken as the final product with no additional treatment, or it may be treated to halt the polymerization process before complete conversion of the monomer and/or to recover unconverted monomer. The latter alternative is illustrated in the drawing where means 14 is provided for introducing a shortstop solution, e. g. alkali, from tank 15 into collecting tank 13, and means 16, for withdrawing slurry for purposes of monomer recovery.

An inert gas such as carbon dioxide is introduced into the reactor at 17 to provide an inert atmosphere.

In the operation of this apparatus, an aqueous slurry of previously prepared polymer may be charged to the reactor 1 where, with agitation, it is circulated and heated to the desired temperature. The slurry is then deaerated in any desired manner as, for example, by the addition of chips of Dry Ice, and if necessary, the pH is adjusted by addition of sulfuric acid.

The several metering pumps 17a, 18, and 19 supplying the feed components 6, 7, and 8, respectively, are then started and, after adjustment to the necessary ratio, allowed to pump steadily throughout the run.

The system is maintained at a constant temperature by adjustment of the cooling water to the heat exchanger 5 in the circulation system.

When the system has been running over a period of time such that several reactor volumes have been discharged through the overflow 12 under essentially constant conditions, it is judged that a state of equilibrium or a steady state has been obtained and samples are taken for determination of monomer conversion, average molecular weight of polymer, etc.

*Example 6*

The following conditions are realized in carrying out the above-described general procedure in the illustrated apparatus.

Feeds:

| | |
|---|---|
| Aqueous (0.3% $H_2SO_4$)_____lbs./hr__ | 49.3 |
| Catalyst (15.0% $Na_2SO_3$, 4.22% $NaClO_3$ water solution) _____lbs./hr__ | 2.25 |
| Monomer (97% acrylonitrile, 3% water) _____lbs./hr__ | 25.9 |
| Reaction temperature_____°C__ | 35 |
| Reaction duration (approx.)_____hrs__ | 9 |
| Residence time_____hrs__ | 1.69 |

Reaction is terminated by shutting off all feed pumps and adding sufficient 10% sodium carbonate solution to the contents to bring the reactor pH to about 9 as quickly as possible. 131 lbs. of slurry are drained from the reactor and filtered in a 24-inch centrifuge. This produces 65 lbs. of centrifuge cake having a water content of 41%, representing a 90.0% conversion. The polymer has an average molecular weight of about 75,000.

The monomer concentration in the feed was 32.5%, the monomer concentration in the reactor was 3.3%, and the polymer concentration of the reactor was 29.2%. The percent catalyst, based on the weight of monomer, was about .38%, and the oxidizable component to catalyst ratio was about 3.56:1.

Example 7

The procedure described above for the illustrated apparatus is repeated under the following conditions:

Feeds:
- Aqueous (0.25% $H_2SO_4$) _____ lbs./hr __ 41.8
- Catalyst (15.0% $Na_2SO_3$, 4.22% $NaClO_3$ water solution) _____ lbs./hr __ 2.32
- Monomer (95% acrylonitrile 5% methyl acrylate mixture containing 3% water) _____ lbs./hr __ 26.03
- Reaction temperature _____ ° C __ 36.5
- Reaction duration (approx.) _____ hrs __ 15
- Residence time _____ hrs __ 1.85

All of the reactor overflow from the beginning to the end of this run is centrifuged yielding 621 lbs. of wet cake, which is equivalent to 391 lbs. of dry copolymer including 37 lbs., on a dry basis, of seed polymer added at the beginning of the run. The net dry polymer production of 354 lbs. is obtained from a net monomer feed of 389 lbs. which represents a 91% conversion. The average molecular weight of the copolymer is about 78,600.

The monomer concentration in the feed was 36.0%, the monomer concentration in the reactor was about 3.2%, and the polymer concentration of the reactor was 32.8%. The percent oxygen liberating catalyst, based on the weight of the monomer, was about .39%, and the oxidizable component to catalyst ratio was 3.56:1.

Example 8

The procedure described above in conjunction with the illustrated apparatus is carried out under the following conditions:

Feeds:
- Water _____ lbs./hr __ 43.0
- Catalyst I (2.12% $Na_2S_2O_5$ water solution) _____ lbs./hr __ 1.83
- Catalyst II (10.00% $(NH_4)_2S_2O_8$ water solution) _____ lbs./hr __ 1.85
- Monomer (95% acrylonitrile, 5% methyl acrylate mixture containing 2% water) lbs./hr __ 25.45
- Reaction temperature _____ ° C __ 35.3
- Reaction duration (approx.) _____ hrs __ 13½
- Approx. residence time _____ hrs __ [1] 1.97

[1] Reactor volume at overflow level slightly greater than in previous examples.

A 96.4% conversion to a copolymer having an average molecular weight of about 167,000, based on the final reactor material only, is obtained.

The monomer concentration of the feed was 34.6. The monomer concentration of the reactor was 1.3%, and the polymer concentration of the reactor was 33.3%. The percent catalyst, based on the weight of the monomer, was .74%, and the activator to catalyst ratio was .21:1.

It will be noted in the above examples (Examples 1–8) that the concentration of monomer in the feed is from about 28% in Examples 1–5 up to about 36% in Example 7. Monomer concentrations of this order of magnitude produce substantially constant quantities of polymer in the polymerization zone of the order of about 19% (Example 5) to about 33% (Example 8) by weight of the total polymer suspension therein. The amount of monomer concentration in the polymerization zone with the above-described polymer suspension is equal to from between about 1.3% of the total polymer suspension, as in Example 8, to about 8.5%, as in Example 5.

Polymer used in the preceding examples for seeding will, of course, vary depending upon the conditions under which it is produced. If it is generated in situ by starting the operation as a batch process or if, previously prepared, it differs considerably in properties such as molecular weight from the desired polymer product, my continuous polymerization process should be allowed to proceed until both the seed polymer has been purged and a steady state or equilibrium is set up before any polymer product is collected. Thus, in Examples 6 and 8 only, the reactor contents are considered to be representative of steady state conditions and the overflow material is discarded. Such a run is useful for collecting data.

When, as in Example 7, however, the seed polymer is known to be approximately equivalent to desired polymer produced under steady state conditions and a steady state can be established quickly, then all polymerized material, from overflow and from reactor, is collected. Such a run is, of course, an ideal production run.

My invention is primarily directed to the polymerization of acrylonitrile and to the copolymerization of acrylonitrile with up to about 15% by weight of other monoethylenically unsaturated compounds which are copolymerizable therewith and which are water soluble, to the extent of at least about 1%. If the copolymer is destined for fiber spinning, co-monomers which impart particularly desirable properties to the spun fiber, i. e. increased hydrophilic characteristics, greater affinity for dyestuffs, etc. such as hydroxyethyl methacrylate, methyl acrylate, allyl alcohol, methyl vinyl ketone, allyl amine, the amino styrenes, vinyl pyridine, amino alcohol esters of acrylic, methacrylic, fumaric and maleic acids, acid salts of the foregoing amino compounds, and the like, are preferably selected.

However, my invention contemplates broadly the use as a co-monomer of any polymerizable, monoethylenically unsaturated compound, regardless of its water solubility, which can be incorporated in a reaction slurry in the desired quantity (not more than about 15%) without causing separation of an additional monomer phase under reaction conditions. Absolute water solubility of the co-monomer is not a critical factor because the co-monomer is present in an acrylonitrile solution containing solid polymer dispersed therein. Thus, a co-monomer which is not sufficiently soluble in water may be in an acrylonitrile solution. Accordingly, operative co-monomers may be selected from the group of monoethylenically unsaturated compounds including styrene, alkyl-substituted styrenes as the o-, m- and p-methyl styrenes, alpha, para-dimethyl styrene, 2,4-dimethyl styrene, etc. acrylamide, methacrylamide, methacrylonitrile, acrylic acid, methacrylic acid, alkyl esters and salts of acrylic and methacrylic acids, vinyl acetate, monoallyl phthalate, and the like. Mixtures of two or more co-monomers may, of course, also be used. It will be noted that some of these compounds are water soluble and some are water insoluble.

According to my process, at steady state, the reaction mixture contains from about 10% to about 40% of the polymer to be formed, and from about 1% to about 10% of the monomer employed.

It will, of course, readily appear that in a continuous process for polymerization according to the present invention that where the polymerization zone contains amounts of from between 10 and 40% polymer and preferably 19 to 40%, and 1 and 10% monomer, that a feed sufficient to maintain such a composition under steady state must necessarily contain a minimum of 11% monomer and a maximum of 50% monomer, and preferably from between 20 and 50% monomer. This is illustrated by Examples 1 through 8, wherein the sum of the polymer concentration in the polymerization zone and the monomer concentration therein is about equal to the concentration by weight of monomer in the feed to said zone at steady state.

Thus, my process results in an increased polymerization rate and yield and there is little, if any, monomer to recover, particularly if a second polymerization stage is employed, which state may merely consist in holding for a time in the absence of air. The process is economical because of higher output for any given size equipment or, conversely, it is an advantage of this process that it permits use of smaller equipment, than required in, for example, batch processes, to produce the same amount of polymer.

Relatively low polymerization temperatures ranging from about 20° to about 70° C. are desirable. I prefer polymerization at a temperature of about 30° to about 40° C.

It is desirable to conduct the process of the present invention in the absence of oxygen which has a definite inhibiting effect on the polymerization. Suitable inert gases such as nitrogen and carbon dioxide may be used to displace air in the reaction zone.

My process is not limited to the use of any particular polymerization catalyst, although those oxygen-containing catalysts which are at least somewhat water soluble are definitely preferred. The ideal catalyst is one which will bring about a high conversion of monomer in a short time at about 35° C. since otherwise the monomer concentration builds up and causes gelation. I have obtained excellent results using redox catalyst systems comprised of an oxygen liberating component as catalyst and an oxidizable component such as the chloric acid-bisulfite system described and claimed in the copending application of Arthur Cresswell, Serial No. 208,979, filed February 1, 1951, now Patent No. 2,751,374, dated June 19, 1956. In these systems the chloric acid may be considered the oxygen liberating catalyst and the bisulfite the oxidizable component. In addition, those systems comprising peroxy compounds and sulfoxy compounds such as the ammonium persulfate and sodium bisulfite catalyst described in U. S. Patents Nos. 2,436,926 and 2,462,354, are contemplated. In these systems, the persulfate functions as the oxygen liberating catalyst and the bisulfite functions as the oxidizable component or reducing agent or activator. While some catalyst components may be mixed and fed as one solution, it may be desirable or necessary to use separately metered catalyst solutions. The examples illustrate both methods.

In the above noted U. S. Patent No. 2,751,374, an amount of chloric acid catalyst from between about 0.01% to about 1%, based on the weight of monomer is generally desirable. Corresponding quantities of sulfurous acid or hydro-sulfurous acid, based on monomer weight, are from between about 0.03% to about 3% sulfurous acid and from about 0.015% to about 1.5% hydro-sulfurous acid.

The relative proportions by weight of chloric acid to sulfurous acid are from about 1:2 to 1:4 and the relative proportions by weight of chloric acid to hydro-sulfurous acid are about 1:1 to 1:2, respectively.

In U. S. Patent No. 2,436,926, the water-soluble oxygen yielding substance, as for example, perbisulfate salt, is employed in an amount of from between 0.1 to 10%, based on the weight of the monomer, and preferably in an amount of from between 0.1 to 4%, based on the monomer weight, and the amount of adjuvant and activator employed will vary from between about 0.1 to 1 molar portion, based on the catalyst employed, and preferably in an amount of between 0.05 to 2%, based on monomer weight.

With respect to U. S. Patent No. 2,462,354, between about 0.01% and 5% of oxygen liberating catalyst and preferably from between 0.1 and 4% based on monomer weight may be employed, and from between about 0.001% to 5% of an oxidizable component may be utilized. In general, the preferred proportions of oxidizable sulfur-containing component will be in the neighborhood of 0.05 to 0.5%, based on the monomer.

As indicated by the above disclosure and examples, the ratio between the oxidizable component and the oxygen liberating catalyst is from between 1:5 and 4:1, respectively. Thus, Examples 1, 4, 6 and 7 indicate ratios of 3.58 and 3.56:1, respectively, while Examples 2, 3, 5 and 8 indicate ratios of .41; 2.02; .21 and .21:1, respectively.

Various modifiers, such as catalyst promoters and chain transfer agents, may be added. Iron, copper and silver, present in the form of a soluble salt in very small amounts of the order of 2 to 50 parts per million, are particularly desirable, especially in conjunction with a chloric acid-bisulfite catalyst, since they increase the rate of polymerization. Mercaptans which are sufficiently water soluble but not too volatile, as for example, lauryl and dodecyl mercaptans, also tend to increase the polymerization rate and at the same time their use results in the production of a polymer of lower molecular weight. The polymer molecular weight can also be decreased by use of alcohols such as allyl alcohol, isopropanol, and the like.

It is an advantage of my process that with certain catalyst formulations only about 25% to 50% of the quantity of catalyst required in prior art batch processes for polymerizing acrylonitrile is required to get polymers of comparable molecular weights. The reaction mixtures therefore possess better heat stability, and the color of the polymer is improved.

Perhaps the most striking improvement realized by my new continuous process for polymerizing acrylonitrile is the production of fluid slurries of polymer which can be pumped and handled at high solids of the order of 35% to 40%. Moreover, these slurries can be centrifuged to a low water content of the order of 25% to 35% and dissolved directly in thiocyanate solution if the polymer is destined for fiber spinning. In corresponding batch processes, a slurry containing only about 7% solids is thick and difficult to handle. Moreover, when it is centrifuged, the centrifuge cake contains about 80% water and is not usable directly for solution in thiocyanate solvent preparatory to spinning.

I do not wish to be limited to any particular theory, but I believe that this remarkable difference in the physical properties of polymers is a result of the actual structure of the polymer. When observed and studied under a microscope, acrylonitrile polymers and polymers produced by prior art bath processes possess a loose lacy structure, whereas similar polymers or copolymers prepared by my process are in the form of extremely compact rounded discrete particles.

There is, of course, a definite relationship between the critical features of my process and the production of the desired end product, namely, a fluid slurry of high solids content. Agitation is one important factor. The fluid slurries obtained by my process are fluid only when subjected to agitation and conversely, agitation must be sufficient to maintain fluidity of the polymer suspension. When allowed to stand, the slurries become thick. Thus, if dead spots occur anywhere in the reactor, thickening commences, removal of heat of polymerization is prevented locally and the entire mass soon solidifies. The amount of agitation required cannot be specified, except by reference to a given reactor. It should be sufficient to produce turbulence, preferably without splashing, and to subject each portion of the mass periodically to intense shearing.

Large amounts of polymer fines in suspension give stiff slurries, and it is important to keep most of the particles in the size range of about 10 to 50 microns. This can be controlled by maintaining constant feeds, constant temperature, and the like. Agitation is also a factor in controlling the polymer particle size, but alone it will not overcome the effect of particles which are below the preferred size range.

It has been pointed out above that polymerization may be carried out over a range of about 20° to about 70° C. The temperature should, however, not be allowed to rise rapidly for any reason, i. e. it should be substantially constant, or thickening of the slurry will result. Thus, polymerization can be carried on at 30° C. or at 60° C. with satisfactory results, but it is not desirable to start at one temperature and change abruptly and rapidly to the other in the middle of the run.

Monomer concentration in the reaction mixture should be kept low, since slurries tend to thicken when it is high. This factor is substantiated by the following data obtained from synthetic mixtures:

| Parts by Weight | | | Slurry |
|---|---|---|---|
| Polymer | Monomer | Water | |
| 30 | 9 | 70 | Fluid. |
| 30 | 10 | 60 | Sl. less fluid. |
| 30 | 20 | 50 | Thick paste. |
| 35 | 0 | 65 | Fluid. |
| 35 | 10 | 55 | Fairly fluid. |
| 20 | 10 | 70 | Fluid, rapid phase separation. |

In practice, other changes, for example, particle size, occur in the system when the monomer concentration builds up and its effect on the fluidity of the slurry becomes magnified. In general, the monomer concentration in the reaction mixture should be kept constant within the range of from about 1% to about 10%, as noted hereinabove, and this is achieved by controlling the variables of the present process. If desired, the polymer slurry produced by my process may be run into a holding tank or a series of holding tanks and there further polymerized by exclusion of air and, where necessary, by the addition of more catalyst. In any such additional polymerization stage, the monomer concentration in the reaction mixture may well be below 1%.

My polymerization process is carried out in aqueous solution or dispersion in the absence of any substantial quantity of surface active agent, i. e. less than that quantity which would produce an emulsion of the reaction slurry under the reaction conditions. It is desirable in any event, when preparing polymers or copolymers of acrylonitrile for fiber spinning, to avoid the complications of removing such an agent from the polymer compositions before spinning. However, there may be instances where the addition of small amounts of such agents is desirable or even necessary to obtain a given desired result.

The aqueous reaction mixture should have a pH of from about 1 to 4, preferably from about 2 to 3, which pH is maintained by the addition of acid in the aqueous feed stream or, if desired, the acid may be added as a separate feed stream with the other components of the reaction mixture. When redox catalyst systems are employed, these pH ranges have given excellent results.

Fillers, dyes, pigments, plasticizers, other resins, both natural and synthetic, and the like may be incorporated with the polymers and copolymers prepared by my process either before, during or after polymerization to render the products more suitable for whatever use they are to be put, i. e. molding and surface coating compositions, adhesives, fibers, etc.

For the preparation of acrylonitrile, polymers or copolymers to be used in the preparation of solution spun fibers, a uniform average molecular weight of between about 60,000 and 90,000 has been found to be most desirable. It is a great advantage of my new process that a polymer of uniform average molecular weight can be obtained.

When in the claims, "polymerization" of acrylonitrile is recited, the term is intended to cover copolymerization of acrylonitrile with other polymerizable monomers, i. e. co-monomers, to form copolymers just as it obviously covers polymerization of acrylonitrile, in the more restricted sense, to produce homopolymers of acrylonitrile.

This application is a continuation-in-part of Serial No. 227,643, filed May 22, 1951, and entitled "Continuous Process for the Polymerization of Acrylonitrile," now Patent Number 2,777,832, issued January 15, 1957.

I claim:

1. A continuous process for producing polymer in aqueous medium, which comprises feeding, in a continuous manner, into an agitated polymerization zone, an aqueous monomer composition, acidic aqueous liquor, and a redox catalytic system, the monomer content of the total feed being from between 11 and 50% by weight, said monomer comprising acrylonitrile with up to about 15% by weight of a different monoethylenically unsaturated compound, said acidic aqueous liquor being sufficient to maintain said aqueous medium at a pH of from between 1 and 4, said redox catalytic system comprising an oxygen liberating catalyst and an oxidizable component, said catalyst being present in an amount of from between about .01 and 10%, based on the weight of the monomer, said oxidizable component being employed with respect to said catalyst in an amount of from between 1:5 and about 4:1, respectively, whereby the employment of such continuous process at steady state results in the conversion of at least about 70% of the monomeric material to a corresponding polymeric material.

2. A continuous process for producing polymer in aqueous medium, which comprises feeding, in a continuous manner, into an agitated polymerization zone, an aqueous monomer composition, acidic aqueous liquor, and a redox catalytic system, the monomer content of the total feed being from between 11 and 50% by weight, said monomer comprising acrylonitrile with up to about 15% by weight of a different monoethylenically unsaturated compound, said acidic aqueous liquor being sufficient to maintain said aqueous medium at a pH of from between 1 and 4, said redox catalytic system comprising chloric acid and an oxidizable component, selected from the group consisting of sulfurous and hydro-sulfurous acid, said catalyst being present in an amount of about .01 to about 10%, based on the weight of the monomer, said oxidizable component being employed with respect to said catalyst in an amount of from between 2:1 and 4:1, respectively, whereby the employment of such continuous process at steady state results in the conversion of at least about 70% of the monomeric material to a corresponding polymeric material.

3. A continuous process for producing polymer in aqueous medium, which comprises feeding, in a continuous manner, into an agitated polymerization zone, an aqueous monomer composition, acidic aqueous liquor, and a redox catalytic system, the monomer content of the total feed being from between 11 and 50% by weight, said monomer comprising acrylonitrile with up to about 15% by weight of a different monoethylenically unsaturated compound, said acidic aqueous liquor being sufficient to maintain said aqueous medium at a pH of from between 1 and 4, said redox catalytic system comprising a water-soluble peroxy compound and a water-soluble sulfoxy compound, the peroxy compound being present in an amount of from between about .1 to about 10%, based on the weight of the monomer, said sulfoxy compound being employed with respect to said peroxy compound in an amount of from between about 1:5 to about 2:1, respectively, whereby the employment of such continuous process at steady state results in the conversion of at least about 70% of the monomeric material to a corresponding polymeric material.

4. A continuous process for producing polymer in aqueous medium, which comprises feeding, in a continuous manner, into an agitated polymerization zone, an aqueous monomer composition, acidic aqueous liquor, and a redox catalytic system, the monomer content of the total feed being from between 20 and 50% by weight, said monomer comprising acrylonitrile with up to about 15% by weight of a different monoethylenically unsaturated compound, said acidic aqueous liquor being sufficient to maintain said aqueous medium at a pH of from between 2 and 3, said redox catalytic system comprising an oxygen liberating catalyst and an oxidizable component, said catalyst being present in an amount of from between about .01 and about 10%, based on the weight of the monomer, said oxidizable component being employed with respect to said catalyst in an amount of from between 1:5 and 4:1, respectively, whereby the employment of such continuous process at steady state results in the conversion of at least about 70% of the monomeric material to a corresponding polymeric material.

5. A continuous process for producing polymer in aqueous medium, which comprises feeding, in a continuous manner, into an agitated polymerization zone, an aqueous monomer composition, acidic aqueous liquor, and a redox catalytic system, the monomer content of the total feed being from between 11 and 50% by weight, said monomer consisting essentially of acrylonitrile, said acidic aqueous liquor being sufficient to maintain said aqueous medium at a pH of from between 1 and 4, said redox catalytic system comprising an oxygen liberating catalyst and an oxidizable component, said catalyst being present in an amount of from between about .01 and about 10%, based on the weight of the monomer, said oxidizable component being employed with respect to said catalyst in an amount of from between 1:5 and about 4:1, respectively, whereby the employment of such continuous process at steady state results in the conversion of at least about 70% of the monomeric material to a corresponding polymeric material.

6. A process according to claim 5 wherein the monomer content is from between 20 and 50% by weight of the total feed, and the pH of the aqueous medium is between 2 and 3.

7. A continuous process for producing polymer in aqueous medium, which comprises feeding, in a continuous manner, into an agitated polymerization zone, an aqueous monomer composition, acidic aqueous liquor, and a redox catalytic system, the monomer content of the total feed being from between 11 and 50% by weight, said monomer containing a mixture of 95% by weight acrylonitrile and 5% by weight methyl acrylate, said acidic aqueous liquor being sufficient to maintain said aqueous medium at a pH of from between 1 and 4, said redox catalytic system comprising an oxygen liberating catalyst and an oxidizable component, said catalyst being present in an amount of from between about .01 and about 10%, based on the weight of the monomer, said oxidizable component being employed with respect to said catalyst in an amount of from between 1:5 and about 4:1, respectively, whereby the employment of such continuous process at steady state results in the conversion of at least about 70% of the monomeric material to a corresponding polymeric material.

8. A process according to claim 7 wherein the monomer content is from between 20 and 50% by weight of the total feed, and the pH of the aqueous medium is between 2 and 3.

9. A continuous process for producing polymer in aqueous medium, which comprises feeding, in a continuous manner, into an agitated polymerization zone, an aqueous monomer composition, acidic aqueous liquor, and a redox catalytic system, the monomer content of the total feed being from between 11 and 50% by weight, said monomer containing a mixture of 90% by weight acrylonitrile, 5% by weight methyl acrylate, and 5% by weight allyl amine, said acidic aqueous liquor being sufficient to maintain said aqueous medium at a pH of from between 1 and 4, said redox catalytic system comprising an oxygen liberating catalyst and an oxidizable component, said catalyst being present in an amount of from between about .01 and about 10%, based on the weight of the monomer, said oxidizable component being employed with respect to said catalyst in an amount of from between 1:5 and about 4:1, respectively, whereby the employment of such continuous process at steady state results in the conversion of at least about 70% of the monomeric material to a corresponding polymeric material.

10. A process according to claim 9 wherein the monomer content is from between 20 and 50% by weight of the total feed, and the pH of the aqueous medium is between 2 and 3.

References Cited in the file of this patent

UNITED STATES PATENTS

| | | |
|---|---|---|
| 2,735,831 | Coover | Feb. 21, 1956 |
| 2,751,374 | Cresswell | June 19, 1956 |